United States Patent [19]

Shimamura et al.

[11] 3,878,265

[45] Apr. 15, 1975

[54] BLEND OF POLYVINYL RESIN WITH HYDROXY ALKYL ACRYLATE-CONTAINING GRAFT COPOLYMERS

[75] Inventors: Takeshi Shimamura; Tanoshi Yamagoshi, both of Niihama; Minoru Terakawa, Saijyo; Yoshiaki Nishikubo, Niihama, all of Japan

[73] Assignee: Sumitomo Naugatuck Co., Ltd., Osaka, Japan

[22] Filed: July 25, 1972

[21] Appl. No.: 275,103

Related U.S. Application Data

[62] Division of Ser. No. 59,373, July 29, 1970, abandoned.

[30] Foreign Application Priority Data

July 29, 1969  Japan.............................. 44-60279
Aug. 19, 1969  Japan.............................. 44-65886

[52] U.S. Cl.............. 260/876 R; 260/880; 260/885; 260/886
[51] Int. Cl......................... C08f 15/00; C08f 19/00
[58] Field of Search........................ 260/876, 880 R

[56] References Cited
UNITED STATES PATENTS
3,401,213   9/1968   Trementozzi et al. .......... 260/880 R FOREIGN PATENTS OR APPLICATIONS
1,039,728   8/1966   United Kingdom............. 260/880 R
1,579,430   8/1969   France............................ 260/880 R

*Primary Examiner*—Murray Tillman
*Assistant Examiner*—Richard B. Turer
*Attorney, Agent, or Firm*—Craig & Antonelli

[57]   ABSTRACT

A thermoplastic resin composition of high impact strength and excellent transparency which comprises 99 to 20 parts by weight of a vinyl chloride resin having not less than 50 % by weight of vinyl chloride as the main constituent and 1 to 80 parts by weight of a graft copolymer blended therewith, the graft copolymer comprising 20 to 80 % by weight of one or more conjugated diolefinic polymers having not less than 50 % by weight of one or more conjugated diolefinic monomers as the main constituent and 80 to 20 % by weight of monomers graft polymerized thereon, the monomers comprising 0.5 to 50 % by weight of at least one of polymerizable carboxylic hydroxyalkyl ester monomers and polymerizable acrylic ester monomers, 9.5 to 99.5 % by weight of one or more polymerizable methacrylic ester monomers and 30 to 65 % by weight of one of more polymerizable aromatic vinyl monomers.

14 Claims, No Drawings

BLEND OF POLYVINYL RESIN WITH HYDROXY ALKYL ACRYLATE-CONTAINING GRAFT COPOLYMERS

This is a division of application Ser. No. 59,373, filed July 29, 1970, and now abandoned.

The present invention relates to a thermoplastic resin composition and to the production thereof.

In one aspect of the present invention, it is concerned with a thermoplastic resin composition of vinyl chloride having a high impact strength and a good transparency, and to its production. In another aspect of this invention, it is concerned with a graft copolymer useful as an essential component in said thermoplastic resin composition of vinyl chloride, and to its production.

As is well known in the art, vinyl chloride resins have favorable and good properties with respect to processability, transparency, non-flammability, corrosion resistance, etc. Because of its insufficient impact strength, however, its field of application is considerably restricted. Attempts have been made to incorporate a rubber material into vinyl chloride resins in order to improve the inferior property of insufficient impact strength. This incorporation is effective in improving the impact strength, but the transparency of the resins becomes inferior. Maintenance of a good transparency could be attained by equalization of the refractive index of the rubber material phase to that of the resin phase or by minimizing the particle size of the rubber material to as small an extent as possible. However, the equalization of the refractive indexes is almost impossible because of their dissimilarity in chemical structure. Furthermore, the minimization of the size of the rubber particles necessarily results in an inferiority of the impact strength.

Recently, it was reported that the use of a graft copolymer obtained by the graft polymerization of polymerizable monomers on butadiene polymer particles dispersed in an aqueous medium in the presence of an agglomeration agent of the particles as the rubber material affords a thermoplastic resin composition of vinyl chloride having an improved impact strength without a substantial reduction of the transparency inherent to vinyl chloride resins [Japanese Patent Publications Nos. 19248/1967, 20847/1967, 23541/1967, 12158/1968 and 453/1969]. However, in this instance, a relatively large amount of the agglomeration agent is required in order to attain an effective improvement of the impact strength, and the transparency of the resin is not sufficiently satisfactory as compared with the case wherein the rubber particles are not agglomerated. In addition, the agglomeration during the graft polymerization tends to make the dispersion state unstable, whereby coagulums or flocks of the rubber material are formed to a great extent resulting in a large amount of sticky materials being adhered on the inner wall of the reactor or the agitator, resulting in a loss of productivity. Further, the resultant graft copolymer latex is so mechanically unstable that the coagulums or flocks may form at any later stage, e.g., during transportation and storage, whereby apparatus such as pumps and piping can become clogged.

In order to eliminate these defects, the addition of a relatively large amount of emulsifier during the polymerization and/or the addition of a relatively large amount of a stabilizer after the polymerization have been employed. However, the use of an emulsifier in a large amount during the polymerization prevents graft polymerization with agglomeration. Moreover, the use of an emulsifier as well as a stabilizer in large amounts is uneconomical and reduces the heat stability of the composition incorporated with the resulting graft copolymer.

A basic object of the present invention is to provide a thermoplastic resin composition of vinyl chloride having a good transparency and a high impact strength. Another object of this invention is to provide a process for production of such thermoplastic resin composition. A further object of the invention is to provide a graft copolymer advantageously used for production of such thermoplastic resin composition. A still further object of the invention is to provide a method for preparing the graft copolymer useful as an essential component in such thermoplastic resin composition. These and other objects will be apparent to those conversant with the art to which the present invention pertains.

The thermoplastic resin composition of vinyl chloride according to the present invention comprises 99 to 20 parts by weight of a vinyl chloride resin having not less than 50 % by weight of vinyl chloride as the main constituent and 1 to 80 parts by weight of a graft copolymer blended therewith, the graft copolymer comprising 20 to 80 % by weight of one or more conjugated diolefinic polymers having not less than 50 % by weight of one or more conjugated diolefinic monomers as the main constituent and 80 to 20 % by weight of monomers graft polymerized thereon, the monomers comprising 0.5 to 50 % by weight of at least one of polymerizable carboxylic hydroxyalkyl ester monomers and polymerizable acrylic ester monomers, 9.5 to 99.5 % by weight of one or more polymerizable methacrylic ester monomers and 30 to 65 % by weight of one or more aromatic vinyl monomers.

For obtaining a thermoplastic resin composition having a desired high impact strength without losing any characteristics inherent to vinyl chloride resin such as good transparency and large modulus, the use of the vinyl chloride resin and the graft copolymer in the said range of weight ratio is essential. Particularly preferred is the use of the vinyl chloride resin and the graft copolymer in a ratio by weight of 70-92 : 30-8.

The vinyl chloride resin may be a homopolymer of vinyl chloride or a copolymer of vinyl chloride with one or more polymerizable monomers in which the vinyl chloride constituent is present in an amount of not less than 50 % by weight. The polymerizable monomers to be herein used may be monoolefinic monomers such as vinyl acetate, vinylidene chloride, acrylonitrile, methacrylonitrile, acrylic acid, alkyl acrylate (e.g. methyl acrylate, ethyl acrylate, butyl acrylate, octyl acrylate), methacrylic acid, alkyl methacrylate (e.g. methyl methacrylate, ethyl methacrylate, propyl methacrylate, butyl methacrylate, octyl methacrylate), acrylamide, vinylic benzene (e.g. styrene, α-methylstyrene, dimethylstyrene, vinyltoluene, chlorostyrene, maleic acid, alkyl maleate (e.g. methyl maleate, ethyl maleate), fumaric acid, alkyl fumarate (e.g. methyl fumarate, ethyl fumarate), vinyl alkyl ether (e.g. vinyl methyl ether, vinyl ethyl ether) and the like.

As the conjugated diolefinic polymers which constitute the principal chain of the graft copolymer, there may be included homopolymers of conjugated diolefinic monomers and copolymers of conjugated diolefinic monomers with one or more polymerizable monomers in which the conjugated diolefinic monomer constituent is present in an amount of not less than 50 % by weight. Examples of the conjugated diolefinic monomers are butadiene, isoprene, chloroprene, etc. The polymerizable monomers to be herein employed include monoolefinic monomers such as acrylonitrile, vinylic benzene (e.g. styrene, α-methylstyrene, dimethylstyrene), alkyl acrylate (e.g. methyl acrylate, ethyl acrylate, butyl acrylate, octyl acrylate), alkyl methacrylate (e.g. methyl methacrylate, ethyl methacrylate, butyl methacrylate, octyl methacrylate), vinyl alkyl ether (e.g. vinyl methyl ether, vinyl ethyl ether) and the like. For the production of the graft copolymer, the use of the copolymers such as butadiene-styrene copolymer, butadiene-acrylonitrile copolymer, butadiene-styrene-acrylonitrile copolymer, butadiene-methyl acrylate copolymer and butadiene-styrene-vinyl chloride copolymer is particularly preferred.

The conjugated diolefinic polymers are normally used in the form of particles dispersed in an aqueous medium. No special limitation lies in the size of the particles. A smaller size is better for increasing the transparency and a larger size is favorable for obtaining a higher impact strength. Usually, the mean size of the particles is from 200 to 2500 Å, and particularly preferred is a mean particle size between 300 and 1300 Å.

The monomers to be graft polymerized onto the conjugated diolefinic polymers are essentially at least one of polymerizable carboxylic hydroxyalkyl ester monomers and polymerizable acrylic ester monomers, one or more polymerizable methacrylic ester monomers and one or more aromatic vinyl monomers, optionally with one or more other polymerizable monomers. The combined amount of these monomers to that of the conjugated diolefinic polymers may be 80–20 parts by weight (favorably 65–35 parts by weight) to 20–80 parts by weight (favorably 35–65 parts by weight). When the conjugated diolefinic polymers are used in a lesser amount, a high impact strength is not realized. In case of a larger amount, the graft copolymer becomes too soft to incorporate into the vinyl chloride resin.

The carboxylic hydroxyalkyl ester monomers may be monocarboxylic esters or dicarboxylic esters. The hydroxyalkyl moiety may have 1 to 5 carbon atoms and also etherified on the hydroxyl group so as to have a hydroxyalkyl group or a polyoxyalkylene chain at the end. Moreover, the hydroxyalkyl moiety may be substituted with an inert substituent such as halogen. Specific examples are hydroxy(lower)alkyl acrylate (e.g. 2-hydroxyethyl acrylate, 3-hydroxypropyl acrylate), hydroxy(lower)alkyl methacrylate (e.g. 2-hydroxyethyl methacrylate, 3-hydroxypropyl methacrylate), dihydroxy(lower)alkyl methacrylate (e.g. 2,3-dihydroxypropyl methacrylate), halohydroxy(lower)alkyl methacrylate (e.g. 3-chloro-2-hydroxypropyl methacrylate), di(lower)alkyleneglycol itaconate (e.g. diethyleneglycol itaconate, dipropyleneglycol itaconate), di(lower)alkyleneglycol fumarate (e.g. diethyleneglycol fumarate), polyoxy(lower)alkylene methacrylate (e.g. polyoxyethylene methacrylate), dipolyoxy(lower)alkylene itaconate (e.g. dipolyoxypropylene itaconate), hydroxy(lower)alkyl lower alkyl itaconate (e.g. hydroxyethyl methyl itaconate), dihydroxy(lower)alkyl itaconate (e.g. di(3-hydroxypropyl) itaconate), hydroxy(lower)alkyl lower alkyl fumarate (e.g. 2-hydroxyethyl methyl fumarate), etc. The acrylic ester monomers include, for instance, lower alkyl acrylate (e.g. methyl acrylate, ethyl acrylate, butyl acrylate, octyl acrylate). The amount of the carboxylic hydroxyalkyl ester monomers and/or the acrylic ester monomers in the combined amount of the said monomers should be 0.5 to 50 % by weight. No material effect is seen when the addition amount is less than 0.5 % by weight. In case of being higher than 50 % by weight, the impact strength becomes insufficient.

Examples of the methacrylic ester monomers are lower alkyl methacrylate (e.g. methyl methacrylate, ethyl methacrylate). The amount of the methacrylic ester monomers in the combined amount of the said monomers should be 9.5 to 99.5 % by weight. The use of a lesser amount results in inferior impact strength and transparency.

As the aromatic vinyl monomers, there may be employed vinylic benzene (e.g. styrene, α-methylstyrene, dimethylstyrene, vinyltoluene, isopropenyltoluene, chlorostyrene). The amount of the aromatic vinyl monomers in the combined amount of the said monomers should be 30 to 65 % by weight. When used in a higher amount, the impact strength is not improved and fluorescence and haze occur so as to lose the transparency.

Examples of the polymerizable monomers which may be employed optionally in a small amount are acrylonitrile, methacrylonitrile, vinyl acetate, vinyl chloride, vinylidene chloride, vinyl ether, etc.

The graft copolymer can be produced by graft polymerizing the said essential monomers with or without the said optional monomers onto the said conjugated diolefinic polymers. The graft polymerization may be carried out in a per se conventional procedure using a polymerization initiator.

As the polymerization initiator, there may be used an oxidation catalyst such as cumene hydroperoxide, t-butyl hydroperoxide, diisopropylbenzene hydroperoxide, lauroyl peroxide, benzoyl peroxide, methyl ethyl ketone peroxide, persulfates and hydrogen peroxide. In combination with the oxidation catalyst, a reduction catalyst such as ferrous sulfate, ascorbic acid, sodium sulfite, sodium hydrogen sulfite, sodium hydrosulfite, dextrin, sodium pyrophosphate, dimethylaniline or the like may be also employed. In general, this oxidation-reduction catalyst system, i.e. a Redox catalyst system, is very advantageous.

One of the typical procedures for carrying out the graft polymerization is as follows:

In a reactor, there is charged a part or total amount of an aqueous dispersion of the conjugated diolefinic polymer, and a reducing agent and a stabilizer may be added thereto when desired. Then, the essential monomers with or without the optional monomers are added to the reactor. This addition of monomers may be carried out individually or in combination, or intermittently or continuously. When a part of the conjugated diolefinic polymer is first charged in the reactor, the remaining amount may be added to the reaction system at an appropriate later stage.

In general, the continuous addition of the monomers in portions is preferred for production of the graft copolymer provided with more improved properties, for example, reducing the depression in impact strength when subjected to roll milling at a high temperature. In this sense, for instance, the graft polymerization may be carried out by subjecting 100 to 20 % by weight of the conjugated diolefinic polymer (on the basis of the total amount of the conjugated diolefinic polymer to be employed) and 10 to 60 % by weight of one or more of the essential monomers, if desired, with one or more of the optional monomers (on the basis of the total amount of the monomers to be employed) to graft polymerization at the first stage and, after maturing or not, subjecting the remaining amount, i.e. 0 to 80 % by weight, of the conjugated diolefinic polymer and the remaining amount, i.e. 90 to 40 % by weight, of the monomers to graft polymerization at the second stage. In such a two stage process, it is preferred that the conversion at the first stage exceed 50 %.

In the above process for the production of the graft copolymer, the polymerization initiator may be added to the reaction system all at one time or in portions. Preferred is, however, the simultaneous addition with the monomers.

For keeping the reaction system stable, an emulsifier conventionally employed for emulsion polymerization may be, if necessary, used. The amount of the emulsifier to be added is, however, not more than 5 parts by weight to 100 parts by weight of the graft copolymer, because it affords a great influence on the graft efficiency and the graft form and also on the physical properties of the thermoplastic resin composition incorporated with the resulting graft copolymer as well as the surface gloss and the coloring.

The thus prepared graft copolymer may be, if desired, incorporated with a small quantity of an antioxidant, a color stabilizer and/or any other additive.

For production of the thermoplastic resin composition of the invention, the vinyl chloride resin and the graft copolymer are blended with or without any additive such as a stabilizer or a plasticizer by a conventional mechanical operation. For instance, a stabilizer for vinyl chloride resin is first uniformly mixed in the vinyl chloride resin and thereafter the graft copolymer is uniformly admixed with the resulting mixture. Although the graft copolymer and the vinyl chloride resin to be blended are each preferred in the form of powder, slurry or latex, any other form may be employed only if their uniform mixation is assured.

The thermoplastic resin composition of the invention is provided with excellent impact strength, resistance to bending whitening, processing stability, surface gloss and transparency. The provision of such properties is first achieved by the use of the polymerizable carboxylic hydroxyalkyl ester monomer and/or the polymerizable acrylic ester monomer. Particularly when the polymerizable carboxylic hydroxyalkyl ester monomer is employed, the graft polymerization can be favorably accomplished with a relatively small amount of an emulsion stabilizer and the thermoplastic resin composition incorporated with the resulting graft copolymer is much reduced in initial coloring. Moreover, the use of the carboxylic hydroxyalkyl ester monomer is not only effective in increasing the compatibility of the graft copolymer with the vinyl chloride resin but also effective in providing the thermoplastic resin composition with an antistatic property.

The thermoplastic resin composition of the present invention is greatly advantageous with respect to easy processability by conventional mechanical procedures such as blow molding, vacuum molding, compression molding and injection molding.

Practical and presently preferred embodiments of the present invention will be hereinafter illustratively shown in the following examples wherein parts are by weight.

EXAMPLE 1

(A) In water (419 parts), there are uniformly dispersed butadiene-styrene (75:25 by weight; Mooney viscosity [ASTM D927–57T], 72) copolymer latex (45 parts in terms of the solid material), dextrin (0.5 part), sodium pyrophosphate (0.15 part), ferrous sulfate (0.01 part), sodium hydroxide (0.4 part), sodium dodecylbenzenesulfonate (2.0 parts) and sodium hydrosulfite (0.5 part), and the temperature is raised up to 70°C. A mixture of cumene hydroperoxide (0.15 part), methyl methacrylate (30 parts), styrene (20 parts) and 2-hydroxyethyl acrylate (5 parts) is dropwise added thereto in 3 hours, and polymerization is completed. The resulting graft copolymer latex is salted out with magnesium sulfate, and the precipitate is collected by filtration and dried to give a white powder. The powder is subjected to roll milling at 150° to 160°C for 5 minutes and pressed at 180°C for 10 minutes to give a test piece, of which the notched charpy impact strength [ASTM D256–54T] is 35 kg.cm/cm$^2$.

Using a graft copolymer prepared as above but replacing 2-hydroxyethyl acrylate (5 parts) by methyl methacrylate (5 parts), there is obtained a test piece for control, of which the notched charpy impact strength is 11 kg.cm/cm$^2$.

In the visual observation on the test pieces of 5 mm thickness, the former is clearly better than the latter in transparency.

(B) The powder (13 parts) obtained from the graft copolymer latex as in the above (A), polyvinyl chloride (degree of polymerization, 750) (87 parts), butyl stearate (1 part) and dibutyl tin dilaurate (2 parts) are subjected to roll milling at 150° to 155°C for 10 minutes. The resulting mixture is pressed at 180°C for 15 minutes to give a test piece, of which the notched charpy impact strength is 37 kg.cm/cm$^2$.

Using a graft copolymer prepared as above but replacing 2-hydroxyethyl acrylate (5 parts) by methyl methacrylate (5 parts), i.e. using methyl methacrylate (35 parts), there is obtained a test piece for control, of which the notched charpy impact strength is 23 kg.cm/cm$^2$.

In the visual observation on the test pieces of 6.2 mm thickness, the former is clearly better than the latter in transparency.

EXAMPLE 2

(A) In water (270 parts), there are uniformly dispersed butadiene-styrene (75:25 by weight) copolymer latex (45 parts in terms of the solid material), dextrin (0.5 part), sodium pyrophosphate (0.15 part), ferrous sulfate (0.01 part) and sodium hydroxide (0.4 part), and the temperature is raised up to 70°C. A mixture of methyl methacrylate (25 parts), 2-hydroxyethyl acrylate (5 parts) and cumene hydroperoxide (0.05 part) and a solution of sodium dodecylbenzenesulfonate (1.5 parts) in water (40 parts) are simultaneously dropwise added thereto in 1.5 hours. After maturing for 1 hour, a solution of dextrin (0.4 part), sodium pyrophosphate (0.15 part) and ferrous sulfate (0.01 part) in water (90 parts) is added to the resulting mixture, and a solution of cumene hydroperoxide (0.05 part) in styrene (25 parts) and a solution of sodium dodecylbenzene-polyoxyethylenesulfate (0.5 part) in water (25 parts)

are simultaneously dropwise added thereto in 1.5 hours. The resulting graft copolymer latex is salted out, and the precipitate is collected by filtration and dried to give a powder. The powder is treated as in Example 1 (A) to prepare a test piece, of which the notched charpy impact strength is 82 kg.cm/cm$^2$ and the transmittance (thickness of the test piece, 5 mm) is 72 % at a wavelength of 640 m$\mu$.

Using a graft copolymer prepared as above but replacing 2-hydroxyethyl acrylate (5 parts) by methyl methacrylate (5 parts), i.e. using methyl methacrylate (30 parts), there is obtained a test piece for control, of which the notched charpy impact strength is 8 kg.cm/cm$^2$ and the transmittance is 41 % at a wavelength of 640 m$\mu$.

(B) The powder (13 parts) obtained from the graft copolymer latex as in the above (A), polyvinyl chloride (degree of polymerization, 750) (87 parts), butyl stearate (1 part) and dibutyl tin dilaurate (2 parts) are treated as in Example 1 (B) to prepare a test piece, of which the notched charpy impact strength is 68 kg.cm/cm$^2$ and the transmittance (thickness of the test piece, 6.2 mm) is 45 % and 54 % respectively at wavelengths of 420 m$\mu$ and 640 m$\mu$.

Using a graft copolymer prepared as above but replacing 2-hydroxyethyl acrylate (5 parts) by methyl methacrylate (5 parts), i.e. using methyl methacrylate (30 parts), there is obtained a test piece for control, of which the notched charpy impact strength is 14 kg.cm/cm$^2$ and the transmittance is 30 % and 52 % respectively at wavelengths of 420 m$\mu$ and 640 m$\mu$.

EXAMPLE 3

(A) In water (547 parts), there are uniformly dispersed butadiene-styrene (75:25 by weight) copolymer latex (45 parts in terms of the solid material), dextrin (0.9 part), sodium pyrophosphate (0.3 part), ferrous sulfate (0.02 part) and sodium hydroxide (0.4 part), and the temperature is raised up to 70°C. A mixture of methyl methacrylate (17.5 parts), 3-hydroxypropyl acrylate (10 parts) and cumene hydroperoxide (0.1 part) and a solution of sodium dodecylbenzenesulfonate (2.0 parts) in water (40 parts) are simultaneously dropwise added thereto in 1.5 hours. Then, a mixture of cumene hydroperoxide (0.1 part), styrene (17.5 parts) and 3-hydroxypropyl acrylate (10 parts) is dropwise added thereto in 1.5 hours. The resulting graft copolymer latex is salted out, and the precipitate is collected by filtration and dried to give a powder. The powder is treated as in Example 1 (A) to prepare a test piece, of which the notched charpy impact strength is 25 kg.cm/cm$^2$.

Using a graft copolymer prepared as above but replacing 3-hydroxypropyl acrylate (10 parts) in the first monomeric mixture by methyl methacrylate (10 parts) and 3-hydroxypropyl acrylate (10 parts) in the second monomeric mixture by styrene (10 parts), there is obtained a test piece for control, of which the notched charpy impact strength is 10 kg.cm/cm$^2$.

In the visual observation on the test pieces of 6.2 mm thickness, the former is clearly better than the latter in transparency.

(B) The powder (13 parts) obtained from the graft copolymer latex as in the above (A), polyvinyl chloride (degree of polymerization, 750) (87 parts), butyl stearate (1 part) and dibutyl tin dilaurate (2 parts) are treated as in Example 1 (B) to prepare a test piece, of which the notched charpy impact strength is 39 kg.cm/cm$^2$.

Using a graft copolymer prepared as above but replacing 3-hydroxypropyl acrylate (10 parts) in the first monomeric mixture by methyl methacrylate (10 parts) and 3-hydroxypropyl acrylate (10 parts) in the second monomeric mixture by styrene (10 parts), there is obtained a test piece for control, of which the notched charpy impact strength is 18 kg.cm/cm$^2$.

In the visual observation on the test pieces of 6.2 mm thickness, the former is clearly better than the latter in transparency.

EXAMPLE 4

(A) In a reactor, there is charged an aqueous dispersion (140 parts) containing butadiene-styrene (76.5:23.5 by weight; Mooney viscosity, 72) copolymer (45 parts), and stirring is started. A solution of dextrin (0.5 part), sodium pyrophosphate (0.15 part) and ferrous sulfate (0.01 part) in water (180 parts) is added thereto, and the temperature is raised up to 70°C under a nitrogen stream. A mixture of methyl methacrylate (20 parts) and cumene hydroperoxide (0.03 part) and a solution of sodium dodecylbenzenesulfonate (1.0 part) in water (26.7 parts) are simultaneously dropwise added to the resulting mixture in 55 minutes. Then, a mixture of ethyl acrylate (10 parts) and cumene hydroperoxide (0.02 part) and a solution of sodium dodecylbenzenesulfonate (0.5 part) in water (13.3 parts) are simultaneously dropwise added thereto in 35 minutes. Maturing is carried out for 1 hour. After the addition of a solution of dextrin (0.4 part), sodium pyrophosphate (0.15 part) and ferrous sulfate (0.01 part) in water (105 parts), a mixture of styrene (25 parts) and cumene hydroxyperoxide (0.05 part) is dropwise added in 1.5 hours. Maturing is then carried out at 70°C for 2 hours, whereby polymerization is completed. The conversion is 99.5%. The resultant graft copolymer dispersion is salted out, and the precipitate is collected by filtration and dried to give a white powder. The powder is subjected to roll milling at 150° to 155°C for 10 minutes and pressed at 180°C for 30 minutes to give a test piece, of which the notched charpy impact strength is 23.4 kg. cm/cm$^2$ and the transmittance (thickness of the test piece, 2 mm) is 73.5% at a wavelength of 640 m$\mu$.

Using a graft copolymer prepared as above but replacing ethyl acrylate (10 parts) by methyl methacrylate (10 parts), i.e. using methyl methacrylate (30 parts), there is obtained a test piece for control, of which the notched charpy impact strength is 8.1 kg. cm/cm$^2$ and the transmittance is 71.0% at a wavelength of 640 m$\mu$.

Using a graft copolymer prepared as above but replacing methyl methacrylate (20 parts) by ethyl acrylate (20 parts), i.e. using ethyl acrylate (30 parts), there is obtained a test piece for control, of which the transmittance is 60.5% at a wavelength of 640 m$\mu$. The composition herein obtained is quite soft, entirely lacks modulus and shows a gummy state so that it can not be used as a thermoplastic resin.

(B) The powder (13 parts) obtained from the graft copolymer dispersion as in the above (A), polyvinyl chloride (degree of polymerization, 750) (87 parts), butyl stearate (1 part) and dibutyl tin dilaurate (2 parts) are treated as in Example 1 (B) to prepare a test piece, of which the notched charpy impact strength is 66.4 kg.cm/cm² and the transmittance (thickness of the test piece, 2 mm) is 65.0 % and 76.0 % respectively at wavelengths of 420 mμ and 640 mμ.

Using a graft copolymer prepared as above but replacing ethyl acrylate (10 parts) by methyl methacrylate (10 parts), i.e. using methyl methacrylate (30 parts), there is obtained a test piece for control, of which the notched charpy impact strength is 14.1 kg.cm/cm² and the transmittance is 64.5 % and 72.5 % respectively at wavelengths of 420 mμ and 640 mμ.

Using a graft copolymer prepared as above but replacing methyl methacrylate (20 parts) by ethyl acrylate (20 parts), i.e. using ethyl acrylate (30 parts), there is obtained a test piece for control, of which the notched charpy impact strength is 4.6 kg.cm/cm² and the transmittance is 54.0 % and 57.0 % respectively at wavelengths of 420 mμ and 640 mμ.

EXAMPLE 5

(A) In a reactor, there is charged an aqueous dispersion (140 parts) containing butadiene-styrene (76.5:23.5 by weight) copolymer (45 parts), and stirring is started. A solution of dextrin (0.9 part), sodium pyrophosphate (0.3 part) and ferrous sulfate (0.02 part) in water (285 parts) is added thereto, and the temperature is raised up to 70°C under a nitrogen stream. A mixture of methyl methacrylate (20 parts), ethyl acrylate (10 parts), styrene (25 parts) and cumene hydroperoxide (0.1 part) and a solution of sodium dodecylbenzenesulfonate (1.5 parts) in water (40 parts) are simultaneously dropwise added to the resulting mixture in 3 hours. After the addition is accomplished, maturing is continued at 70°C for 2 hours, whereby polymerization is completed. Conversion, 97.3 %. The resultant graft copolymer dispersion is salted out, and the precipitate is collected by filtration and dried to give a white powder. The powder is subjected to roll milling at 150° to 155°C for 10 minutes and pressed at 180°C for 30 minutes to give a test piece, of which the notched charpy impact strength is 15.5 kg.cm/cm² and the transmittance (thickness of the test piece, 2 mm) is 73.0 % at a wavelength of 640 mμ.

(B) The powder (13 parts) obtained from the graft copolymer dispersion as in the above (A), polyvinyl chloride (degree of polymerization, 750) (87 parts), butyl stearate (1 part) and dibutyl tin dilaurate (2 parts) are treated as in Example 1 (B) to prepare a test piece, of which the notched charpy impact strength is 45.2 kg.cm/cm² and the transmittance (thickness of the test piece, 2 mm) is 73.5 % and 71.5 % respectively at wavelengths of 420 mμ and 640 mμ.

EXAMPLE 6

(A) In the same manner as in Example 1 (A) but using a monomeric mixture consisting of cumene hydroperoxide (0.15 part), methyl methacrylate (27.5 parts), styrene (20 parts), ethyl acrylate (5 parts) and 2-hydroxyethyl acrylate (2.5 parts), there is obtained a graft copolymer. A test piece made of the graft copolymer shows 40 kg.cm/cm² in notched charpy impact strength.

(B) In the same manner as in Example 1 (B) but using the graft copolymer obtained in the above (A), there is obtained a thermoplastic composition. A test piece made of the thermoplastic composition shows 52 kg.cm/cm² in notched charpy impact strength and 47 % and 58 % in transmittance (thickness of the test piece, 6.2 mm) respectively at 420 mμ and 640 mμ.

EXAMPLE 7

(A) In water (270 parts), there are uniformly dispersed butadiene-styrene (75:25 by weight) copolymer latex (45 parts in terms of the solid material), dextrin (0.9 part), sodium pyrophosphate (0.3 part), ferrous sulfate (0.02 part) and sodium hydroxide (0.4 part), and the temperature is raised up to 70°C. A mixture of 2-hydroxyethyl methacrylate (5 parts), methyl methacrylate (22.5 parts), styrene (27.5 parts) and cumene hydroperoxide (0.12 part) and a solution of sodium dodecylbenzenesulfonate (1.5 parts) in water (40 parts) are simultaneously dropwise added thereto in 3 hours and 1.5 hours, respectively. The resultant graft copolymer latex is salted out, and the precipitate is collected by filtration and dried to give a white powder.

(B) The powder (13 parts) obtained from the graft copolymer latex as in the above (A), polyvinyl chloride (degree of polymerization, 750) (87 parts), butyl stearate (1 part) and dibutyltin dilaurate (2 parts) are subjected to roll milling at 150° to 155°C for 10 minutes. The resulting mixture is pressed at 180°C for 15 minutes to give a test piece, of which the notched charpy impact strength is 46 kg.cm/cm² and the transmittance (thickness of the test piece, 6.2 mm) is 35 % and 58 % respectively at wavelengths of 420 mμ and 640 mμ.

What is claimed is:

1. A thermoplastic resin composition which comprises 99 to 20 parts by weight of a vinyl chloride resin having not less than 50% by weight of vinyl chloride as the main constituent and 1 to 80 parts by weight of a graft copolymer which comprises 20 to 80% by weight of one or more conjugated diolefinic polymers having not less than 50% by weight of one or more conjugated diolefinic monomers as the main constituent and 80 to 20% by weight of monomers graft polymerized thereon, the monomers comprising 0.5 to 50% by weight of at least one polymerizable carboxylic hydroxy(lower) alkyl ester monomer, 9.5 to 69.5% by weight of one or more polymerizable lower alkyl methacrylate monomers and 30 to 65% by weight of one or more polymerizable aromatic vinyl monomers.

2. The resin composition according to claim 1, wherein the conjugated diolefinic polymer is a butadiene-styrene copolymer.

3. The resin composition according to claim 2, wherein the butadiene-styrene copolymer is constituted with 90 to 60 % by weight of butadiene and 10 to 40 % by weight of styrene.

4. The resin composition according to claim 1, wherein the conjugated diolefinic polymer is a butadiene-styrene copolymer constituted with 90 to 60 % by weight of butadiene and 10 to 40 % by weight of styrene and the monomers comprise 0.5 to 50 % by weight of hydroxy(lower)alkyl acrylate, 9.5 to 69.5 % by weight of lower alkyl methacrylate and 30 to 65 % by weight of styrene.

5. The resin composition according to claim 1, wherein the conjugated diolefinic polymer is butadiene-styrene copolymer constituted with 90 to 60 % by weight of butadiene and 10 to 40 % by weight of styrene and the monomers consist essentially of 0.5 to 50 % by weight of 2-hydroxyethyl acrylate, 9.5 to 69.5 % by weight of methyl methacrylate and 30 to 65 % by weight of styrene.

6. The resin composition according to claim 1, wherein said graft copolymer consists essentially of said one or more conjugated diolefinic polymers and said monomers graft polymerized thereon, the graft copolymerized monomers consisting essentially of 0.5 to 50 % by weight of carboxylic hydroxy(lower)alkyl ester, 9.5 to 69.5 % by weight of lower alkyl methacrylate and 30 to 65 % by weight of polymerizable aromatic vinyl monomer.

7. The resin composition according to claim 6, wherein the graft copolymerized monomers consist of 0.5 to 50 % by weight of carboxylic hydroxy(lower)alkyl ester, 9.5 to 69.5 % by weight of lower alkyl methacrylate and 30 to 65 % by weight of styrene.

8. A thermoplastic resin composition which comprises 99 to 20 parts by weight of a vinyl chloride resin having not less than 50% by weight of vinyl chloride as the main constituent and 1 to 80 parts by weight of a graft copolymer which comprises 20 to 80% by weight of one or more conjugated diolefinic polymers having not less than 50% by weight of one or more conjugated diolefinic monomers as the main constituent and 80 to 20% by weight of monomers graft copolymerized thereon, the monomers comprising 0.5 to 50 % by weight of a mixture of polymerizable carboxylic hydroxy(lower)alkyl ester monomers and polymerizable lower alkyl acrylate monomers, the amount of alkyl acrylate monomers in said mixture being about twice the amount of the carboxylic hydroxy(lower)alkyl ester monomers, 9.5 to 69.5 % by weight of one or more polymerizable lower alkyl methacrylate monomers and 30 to 65% by weight of one or more polymerizable aromatic vinyl monomers.

9. The composition according to claim 1, wherein the monomers further comprise at least one monomer selected from the group consisting of acrylonitrile, methacrylonitrile, vinyl acetate, vinyl chloride, vinylidene chloride and vinyl ether.

10. The resin composition according to claim 1, wherein the ratio of the vinyl chloride resin to the graft copolymer in said composition varies between 70 : 30 to 92 : 8.

11. The resin composition according to claim 1, wherein the graft polymer is selected from the group consisting of butadiene-styrene copolymer, butadiene-acrylonitrile copolymer, butadiene-styrene-acrylonitrile copolymer, butadiene-methylacrylate copolymer, butadiene-styrene-vinyl chloride copolymer and mixtures thereof.

12. The resin composition according to claim 1, wherein the monomers graft polymerized on the conjugated diolefinic polymers represent 35 to 65 % by weight of the graft copolymer.

13. The resin composition according to claim 1, wherein said graft copolymer consists essentially of said one or more conjugated diolefinic polymers and said monomers graft copolymerized thereon, the graft copolymerized monomers consisting essentially of 0.5 to 50 % by weight of carboxylic hydroxy(lower)alkyl ester, 9.5 to 69.5 % by weight of lower alkyl methacrylate, 30 to 65 % by weight of polymerizable aromatic vinyl monomer, and at least one additional monomer selected from the group consisting of acrylonitrile, methacrylonitrile, vinyl acetate, vinyl chloride, vinylidene chloride and vinyl ether.

14. The resin composition of claim 1, wherein said graft copolymerized monomers include as an additional monomer polymerizable lower alkyl acrylate, the combined amounts of said polymerizable carboxylic hyroxy(lower)alkyl ester monomer and polymerizable lower alkyl acrylate monomer being no more than 50% by weight based on the weight of the graft comonomers.

* * * * *